(12) United States Patent
Pal et al.

(10) Patent No.: US 11,943,121 B2
(45) Date of Patent: Mar. 26, 2024

(54) OBSERVABILITY WITHOUT CHANGING THE TARGET

(71) Applicant: Infinera Corp., San Jose, CA (US)

(72) Inventors: Praveen Kumar Pal, Mountain House, CA (US); Dharmendra Naik, San Jose, CA (US); Madhav Kothapalli, Mountain House, CA (US)

(73) Assignee: Infinera Corporation, San Jose, CA (US)

( * ) Notice: Subject to any disclaimer, the term of this patent is extended or adjusted under 35 U.S.C. 154(b) by 0 days.

(21) Appl. No.: 17/840,875

(22) Filed: Jun. 15, 2022

(65) Prior Publication Data

US 2022/0400067 A1 Dec. 15, 2022

Related U.S. Application Data

(60) Provisional application No. 63/210,534, filed on Jun. 15, 2021.

(51) Int. Cl.
*H04L 43/045* (2022.01)
*H04L 43/0817* (2022.01)
*H04L 43/0894* (2022.01)

(52) U.S. Cl.
CPC ........ *H04L 43/045* (2013.01); *H04L 43/0817* (2013.01); *H04L 43/0894* (2013.01)

(58) Field of Classification Search
CPC ............... H04L 43/045; H04L 43/0817; H04L 43/0894; H04L 43/065
See application file for complete search history.

(56) References Cited

U.S. PATENT DOCUMENTS

| | | | | |
|---|---|---|---|---|
| 7,058,953 | B2 * | 6/2006 | Willard | G06F 11/3495 709/224 |
| 11,063,825 | B1 * | 7/2021 | Maurice | H04L 41/22 |
| 2004/0267691 | A1 * | 12/2004 | Vasudeva | G06F 11/3409 |
| 2019/0361606 | A1 * | 11/2019 | Goker | H03M 13/373 |

* cited by examiner

*Primary Examiner* — Anh Nguyen
(74) *Attorney, Agent, or Firm* — David L. Soltz

(57) ABSTRACT

A network element is herein disclosed. The network element comprises an embedded device having one or more property affecting a function of the embedded device; a computing system having a processor and a memory, the memory being a non-transitory computer-readable medium storing a performance monitoring domain agent, a performance monitoring collector daemon, and a performance monitoring logger. The performance monitoring collector daemon is processor-executable code that when executed by the processor causes the processor to communicate with the embedded device and collect one or more performance information of the embedded device based on the one or more property. The performance monitoring domain agent is processor-executable code that when executed by the processor causes the processor to: retrieve the performance information from the performance monitoring collector daemon; format the performance information into a formatted data based on a metrics metadata file; and transmit the formatted data to the performance monitoring logger.

7 Claims, 3 Drawing Sheets

OBSERVABILITY WITHOUT CHANGING THE TARGET

CROSS REFERENCE TO RELATED APPLICATION

This application claims the benefit of U.S. Provisional Patent Application No. 63/210,534, filed on Jun. 15, 2021, the entire content of which is hereby incorporated herein by reference in its entirety.

BACKGROUND

Optical communication systems typically include a first node that supplies optical signals carrying user information or data to a second node that receives such optical signals via an optical communication path that connects the first node to the second node. In certain optical communication systems, the first node is a so-called hub node that communicates with a plurality of second nodes, also referred to as leaf nodes. The optical communication paths that connect the hub with multiple leaf nodes may include one or more segments of optical fiber connected to one another by various optical components or sub-systems, such as optical amplifiers, optical splitters and combiners, optical multiplexers and demultiplexers, and optical switches, for example, wavelength selective switches (WSS). The optical communication path and its associated components may be referred to as a line system.

In each node, the various optical components or sub-systems and the various electrical components and subsystems generate performance information during operation. For example, the various components may generate a temperature data, an optical power data, a processor utilization data, a memory utilization data, and the like.

A user may desire to know the performance information of one or more component within the node. The user may utilize the performance information to improve the efficiency of the node or to find bottle necks in the operation of the node in order to improve the node's operation. Additionally, because different components generate different data, traditionally there has not been uniformity between reported performance information.

Traditional methods of performance information collection use proprietary code that to collect and report performance information for monitoring for each element of a node. The user, then, must account for the different formats of data received. Additionally, if the user requires additional performance information from a component of a node, then software executing on the node has to be updated in order to report the newly requested data. Then, code changes would need to be made to other network elements between the component and the user in order to properly pass the information from the component to the user.

Therefore, a need exists for systems and methods for loosely coupling the collection and reporting of performance information from the software executing in a component of a node in order to alter collected performance information without having to recompile the software. It is to such a system and method that the present disclosure is directed.

SUMMARY

The problem of loosely coupling the collection and reporting of performance information from the software executing in a component of a node is solved by a network element comprising an embedded device having one or more property affecting a function of the embedded device; a computing system having a processor and a memory, the memory being a non-transitory computer-readable medium storing a performance monitoring domain agent, a performance monitoring collector daemon, and a performance monitoring logger. The performance monitoring collector daemon is processor-executable code that when executed by the processor causes the processor to communicate with the embedded device and collect one or more performance information of the embedded device based on the one or more property. The performance monitoring domain agent is processor-executable code that when executed by the processor causes the processor to: retrieve the performance information from the performance monitoring collector daemon; format the performance information into a formatted data based on a metrics metadata file; and transmit the formatted data to the performance monitoring logger.

Implementations of the above techniques include methods, apparatus, systems, and computer program products. One such computer program product is suitably embodied in a non-transitory computer-readable medium that stores instructions executable by one or more processors. The instructions are configured to cause the one or more processors to perform the above-described actions.

The details of one or more implementations of the subject matter of this specification are set forth in the accompanying drawings and the description below. Other aspects, features and advantages will become apparent from the description, the drawings, and the claims.

BRIEF DESCRIPTION OF DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings.

DETAILED DESCRIPTION

Figure 1:
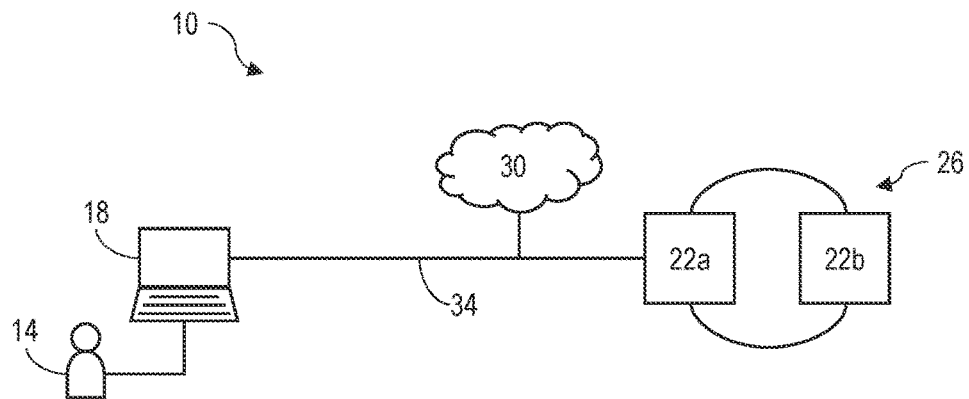
FIG. 1 is a diagram of an exemplary embodiment of hardware forming a system for uniform management of distributed microservices constructed in accordance with the present disclosure.

The following detailed description of example embodiments refers to the accompanying drawings. The same reference numbers in different drawings may identify the same or similar elements.

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted.

The disclosure is capable of other embodiments or of being practiced or carried out in various ways. Also, it is to be understood that the phraseology and terminology employed herein is for purposes of description and should not be regarded as limiting.

As used in the description herein, the terms "comprises," "comprising," "includes," "including," "has," "having," or any other variations thereof, are intended to cover a non-exclusive inclusion. For example, unless otherwise noted, a process, method, article, or apparatus that comprises a list of elements is not necessarily limited to only those elements but may also include other elements not expressly listed or inherent to such process, method, article, or apparatus.

Further, unless expressly stated to the contrary, "or" refers to an inclusive and not to an exclusive "or". For example, a condition A or B is satisfied by one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise. Further, use of the term "plurality" is meant to convey "more than one" unless expressly stated to the contrary.

As used herein, qualifiers like "substantially," "about," "approximately," and combinations and variations thereof, are intended to include not only the exact amount or value that they qualify, but also some slight deviations therefrom, which may be due to computing tolerances, computing error, manufacturing tolerances, measurement error, wear and tear, stresses exerted on various parts, and combinations thereof, for example.

As used herein, any reference to "one embodiment," "an embodiment," "some embodiments," "one example," "for example," or "an example" means that a particular element, feature, structure or characteristic described in connection with the embodiment is included in at least one embodiment and may be used in conjunction with other embodiments. The appearance of the phrase "in some embodiments" or "one example" in various places in the specification is not necessarily all referring to the same embodiment, for example.

The use of ordinal number terminology (i.e., "first", "second", "third", "fourth", etc.) is solely for the purpose of differentiating between two or more items and, unless explicitly stated otherwise, is not meant to imply any sequence or order of importance to one item over another.

The use of the term "at least one" or "one or more" will be understood to include one as well as any quantity more than one. In addition, the use of the phrase "at least one of X, Y, and Z" will be understood to include X alone, Y alone, and Z alone, as well as any combination of X, Y, and Z.

Where a range of numerical values is recited or established herein, the range includes the endpoints thereof and all the individual integers and fractions within the range, and also includes each of the narrower ranges therein formed by all the various possible combinations of those endpoints and internal integers and fractions to form subgroups of the larger group of values within the stated range to the same extent as if each of those narrower ranges was explicitly recited. Where a range of numerical values is stated herein as being greater than a stated value, the range is nevertheless finite and is bounded on its upper end by a value that is operable within the context of the invention as described herein. Where a range of numerical values is stated herein as being less than a stated value, the range is nevertheless bounded on its lower end by a non-zero value. It is not intended that the scope of the invention be limited to the specific values recited when defining a range. All ranges are inclusive and combinable.

When values are expressed as approximations, e.g., by use of the antecedent "about," it will be understood that the particular value forms another embodiment. Reference to a particular numerical value includes at least that particular value, unless the context clearly dictates otherwise. The term "about" when used in reference to numerical ranges, cutoffs, or specific values is used to indicate that the recited values may vary by up to as much as 10% from the listed value. Thus, the term "about" is used to encompass variations of ±10% or less, variations of ±5% or less, variations of ±1% or less, variations of ±0.5% or less, or variations of ±0.1% or less from the specified value.

Circuitry, as used herein, may be analog and/or digital components, or one or more suitably programmed processors (e.g., microprocessors) and associated hardware and software, or hardwired logic. Also, "components" may perform one or more functions. The term "component," may include hardware, such as a processor (e.g., microprocessor), an application specific integrated circuit (ASIC), a field programmable gate array (FPGA), a combination of hardware and software, and/or the like. The term "processor" as used herein means a single processor or multiple processors working independently or together to collectively perform a task.

Software may include one or more computer readable instruction that when executed by one or more component, e.g., a processor, causes the component to perform a specified function. It should be understood that the algorithms described herein may be stored on one or more non-transitory computer-readable medium. Exemplary non-transitory computer-readable mediums may include random access memory (RAM), a read only memory (ROM), a CD-ROM, a hard drive, a solid-state drive, a flash drive, a memory card, a DVD-ROM, a BluRay Disk, a disk, an optical drive, combinations thereof, and/or the like.

Such non-transitory computer-readable mediums may be electrically based, optically based, magnetically based, and/or the like. Further, the messages described herein may be generated by the components and result in various physical transformations.

As used herein, the terms "network—based," "cloud-based," and any variations thereof, are intended to include the provision of configurable computational resources on demand via interfacing with a computer and/or computer network, with software and/or data at least partially located on a computer and/or computer network.

As used herein, a "route" and/or an "optical route" may correspond to an optical path and/or an optical lightpath. For example, an optical route may specify a path along which light is carried between two or more network entities.

Users of optical networks may want to determine one or more performance information associated with the optical network. Over time, the user may want to change what performance information is desirable thereby changing the performance metrics requested from a network element of the optical network. Performance information may be difficult to obtain, aggregate, and display. Implementations described herein assist a user in changing the performance metrics and obtaining performance information, such as network information associated with network entities and optical links between the network entities.

As used herein, an optical link may be an optical fiber, an optical channel, an optical super-channel, a super-channel group, an optical carrier group, a set of spectral slices, an optical control channel (e.g., sometimes referred to herein as an optical supervisory channel, or an "OSC"), an optical data channel (e.g., sometimes referred to herein as "BAND"), and/or any other optical signal transmission link.

In some implementations, an optical link may be an optical super-channel. A super-channel may include multiple channels multiplexed together using wavelength-division multiplexing in order to increase transmission capacity. Various quantities of channels may be combined into super-channels using various modulation formats to create different super-channel types having different characteristics. Additionally, or alternatively, an optical link may be a super-channel group. A super-channel group may include multiple super-channels multiplexed together using wavelength-division multiplexing in order to increase transmission capacity.

Additionally, or alternatively, an optical link may be a set of spectral slices. A spectral slice (a "slice") may represent a spectrum of a particular size in a frequency band (e.g., 12.5 gigahertz ("GHz"), 6.25 GHz, etc.). For example, a 4.8 terahertz ("THz") frequency band may include 384 spectral slices, where each spectral slice may represent 12.5 GHz of the 4.8 THz spectrum. A super-channel may include a different quantity of spectral slices depending on the super-channel type.

The generation of laser beams for use as optical data carrier signals is explained, for example, in U.S. Pat. No. 8,155,531, entitled "Tunable Photonic Integrated Circuits", issued Apr. 10, 2012, and U.S. Pat. No. 8,639,118, entitled "Wavelength division multiplexed optical communication system having variable channel spacings and different modulation formats," issued Jan. 28, 2014, which are hereby fully incorporated in their entirety herein by reference.

Referring now to the drawings, and in particular to FIG. 1, shown therein is a diagram of an exemplary embodiment of a system 10 for performance information collection constructed in accordance with the present disclosure. A user 14 may interact with the system 10 using a user device 18 that may be used to request performance information from one or more network element 22, such as a first node 22*a* and/or a second node 22*b* of an optical network 26. The user device 18 may communicate with the optical network 26 and/or a cloud-based server 30 via a network 34.

In some embodiments, the cloud-based server 30 may comprise a processor and a memory having a data lake that may store copies of performance information such as sensor data, system data, metrics, logs, tracing, etc. in a raw format as well as transformed information that may be used for tasks such as reporting, visualization, analytics etc. The data lake storing the information (either performance information or transformed information) may include structured data from relational databases, semi-structured data, unstructured data, time-series data, and binary data. The data lake may be a data base, a remote accessible storage, or a distributed file system.

In some embodiments, the network 34 may be the Internet and/or other network. For example, if the network 34 is the Internet, a primary user interface of the system 10 may be delivered through a series of web pages or private internal web pages of a company or corporation, which may be written in hypertext markup language, and accessible by the user device 18. It should be noted that the primary user interface of the system 10 may be another type of interface including, but not limited to, a Windows-based application, a tablet-based application, a mobile web interface, an application running on a mobile device, and/or the like.

The network 34 may be almost any type of network. For example, in some embodiments, the network 34 may be a version of an Internet network (e.g., exist in a TCP/IP-based network). In one embodiment, the network 34 is the Internet. It should be noted, however, that the network 34 may be almost any type of network and may be implemented as the World Wide Web (or Internet), a local area network (LAN), a wide area network (WAN), a metropolitan network, a wireless network, a cellular network, a Bluetooth network, a Global System for Mobile Communications (GSM) network, a code division multiple access (CDMA) network, a 3G network, a 4G network, an LTE network, a 5G network, a satellite network, a radio network, an optical network, a cable network, a public switched telephone network, an Ethernet network, combinations thereof, and/or the like. It is conceivable that in the near future, embodiments of the present disclosure may use more advanced networking topologies.

Optical network 26 may include any type of network that uses light as a transmission medium. For example, optical network 26 may include a fiber-optic based network, an optical transport network, a light-emitting diode network, a laser diode network, an infrared network, combinations thereof, and/or other types of optical networks.

The number of devices and/or networks illustrated in FIG. 1 is provided for explanatory purposes. In practice, there may be additional devices and/or networks, fewer devices and/or networks, different devices and/or networks, or differently arranged devices and/or networks than are shown in FIG. 1. Furthermore, two or more of the devices illustrated in FIG. 1 may be implemented within a single device, or a single device illustrated in FIG. 1 may be implemented as multiple, distributed devices. Additionally, or alternatively, one or more of the devices of system 10 may perform one or more functions described as being performed by another one or more of the devices of the system 10. Devices of the system 10 may interconnect via wired connections, wireless connections, or a combination thereof.

Figure 2:
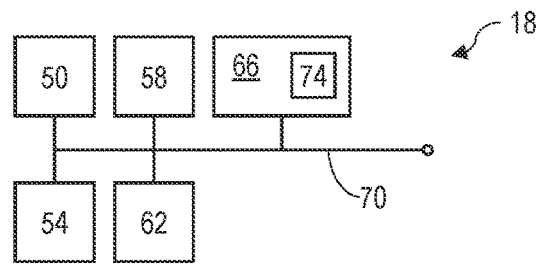
FIG. 2 is a diagram of an exemplary embodiment of a user device for use in the system of FIG. 1 constructed in accordance with the present disclosure.

Referring now to FIG. 2, shown therein is a diagram of an exemplary embodiment of the user device 18 of the system 10 constructed in accordance with the present disclosure. In some embodiments, the user device 18 may include, but is not limited to, implementations as a personal computer, a cellular telephone, a smart phone, a network-capable television set, a tablet, a laptop computer, a desktop computer, a network-capable handheld device, a server, a digital video recorder, a wearable network-capable device, a virtual reality/augmented reality device, and/or the like.

In some embodiments, the user device 18 may include one or more input device 50 (hereinafter "input device 50"), one or more output device 54 (hereinafter "output device 54"), one or more processor 58 (hereinafter "processor 58"), one or more communication device 62 (hereinafter "communication device 62") capable of interfacing with the network 34, one or more non-transitory computer-readable memory 66 (hereinafter "memory 66") storing processor-executable code and/or software application(s), for example including, a web browser capable of accessing a website and/or communicating information and/or data over a wireless or wired network (e.g., the network 34), and/or the like. The input device 50, output device 54, processor 58, communication device 62, and memory 66 may be connected via a path 70 such as a data bus that permits communication among the components of user device 18.

The memory 66 may store an application 74 that, when executed by the processor 58 causes the user device 18 to perform an action such as communicate with or control one or more component of the user device 18 and/or the network 34.

The input device 50 may be capable of receiving information input from the user 14 and/or processor 58, and transmitting such information to other components of the user device 18 and/or the network 34. The input device 50 may include, but is not limited to, implementation as a keyboard, a touchscreen, a mouse, a trackball, a microphone, a camera, a fingerprint reader, an infrared port, a slide-out keyboard, a flip-out keyboard, a cell phone, a PDA, a remote control, a fax machine, a wearable communication device, a network interface, combinations thereof, and/or the like, for example.

The output device 54 may be capable of outputting information in a form perceivable by the user 14 and/or processor 58. For example, implementations of the output device 54 may include, but are not limited to, a computer monitor, a screen, a touchscreen, a speaker, a website, a television set, a smart phone, a PDA, a cell phone, a fax machine, a printer, a laptop computer, a haptic feedback generator, combinations thereof, and the like, for example. It is to be understood that in some exemplary embodiments, the input device 50 and the output device 54 may be implemented as a single device, such as, for example, a touchscreen of a computer, a tablet, or a smartphone. It is to be further understood that as used herein the term user (e.g., the user 14) is not limited to a human being, and may comprise a computer, a server, a website, a processor, a network interface, a user terminal, a virtual computer, combinations thereof, and/or the like, for example.

The network 34 may permit bi-directional communication of information and/or data between the user device 18, the cloud-based server 30, and/or the network element 22. The network 34 may interface with the cloud-based server 30, the user device 18, and/or the network element 22 in a variety of ways. For example, in some embodiments, the network 34 may interface by optical and/or electronic interfaces, and/or may use a plurality of network topographies and/or protocols including, but not limited to, Ethernet, TCP/IP, circuit switched path, combinations thereof, and/or the like. The network 34 may utilize a variety of network protocols to permit bi-directional interface and/or communication of data and/or information between the cloud-based server 30, the user device 18 and/or the network element 20.

Figure 3:
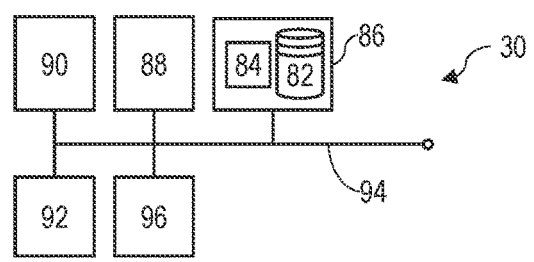
FIG. 3 is a diagram of an exemplary embodiment of a cloud-based server for use in the system of FIG. 1 constructed in accordance with the present disclosure.

Referring now to FIG. 3, shown therein is a diagram of an exemplary embodiment of cloud-based server 30 constructed in accordance with the present disclosure. The cloud-based server 30 may include one or more devices that execute one or more microservice in a manner described herein. In the illustrated embodiment, the cloud-based server 30 is provided with one or more database 82 (hereinafter "database 82"), a cloud server software 84, and one or more processor 88 (hereinafter "processor 88"). The cloud server software 84 and the database 82 are stored on a non-transitory computer-readable storage memory 86 (hereinafter "memory 86") accessible by the processor 88 of the cloud-based server 30.

In some embodiments, the cloud-based server 30 may comprise one or more processor 88 working together, or independently to, execute processor-executable code, such as the cloud server software 84, stored on the memory 86. Additionally, each cloud-based server 30 may include at least one input device 90 (hereinafter "input device 90") and at least one output device 92 (hereinafter "output device 92"). Each element of the cloud-based server 30 may be partially or completely network-based or cloud-based, and may or may not be located in a single physical location.

The processor 88 may be implemented as a single processor or multiple processors working together, or independently, to execute the cloud server software 84 as described herein. It is to be understood, that in certain embodiments using more than one processor 88, the processors 88 may be located remotely from one another, located in the same location, or comprising a unitary multi-core processor. The processors 88 may be capable of reading and/or executing processor-executable code and/or capable of creating, manipulating, retrieving, altering, and/or storing data structures into the memory 86 such as in the database 82.

Exemplary embodiments of the processor 88 may include, but are not limited to, a digital signal processor (DSP), a central processing unit (CPU), a field programmable gate array (FPGA), a microprocessor, a multi-core processor, an application specific integrated circuit (ASIC), combinations, thereof, and/or the like, for example. The processor 88 may be capable of communicating with the memory 86 via a path 94 (e.g., data bus). The processor 88 may be capable of communicating with the input device 90 and/or the output device 92.

The processor 88 may be further capable of interfacing and/or communicating with the user device 18 and/or the network elements 22 via the network 34 using a communication device 96. For example, the processor 88 may be capable of communicating via the network 34 by exchanging signals (e.g., analog, digital, optical, and/or the like) via one or more ports (e.g., physical or virtual ports) using a network protocol to provide updated information to the application 74 executed on the user device 18.

The memory 86 may be implemented as a conventional non-transitory memory, such as for example, random access memory (RAM), CD-ROM, a hard drive, a solid-state drive, a flash drive, a memory card, a DVD-ROM, a disk, an optical drive, combinations thereof, and/or the like, for example.

In some embodiments, the memory 86 may be located in the same physical location as the cloud-based server 30, and/or one or more memory 86 may be located remotely from the cloud-based server 30. For example, the memory 86 may be located remotely from the cloud-based server 30 and communicate with the processor 88 via the network 34. Additionally, when more than one memory 86 is used, a first memory 86 may be located in the same physical location as the processor 88, and additional memory 86 may be located in a location physically remote from the processor 88. Additionally, the memory 86 may be implemented as a "cloud" non-transitory computer-readable storage memory (i.e., one or more memory 86 may be partially or completely based on or accessed using the network 34).

The input device 90 of the cloud-based server 30 may transmit data to the processor 88 and may be similar to the input device 50 of the user device 18. The input device 90 may be located in the same physical location as the processor 88, or located remotely and/or partially or completely network-based. The output device 92 of the cloud-based server 30 may transmit information from the processor 88 to the user 12, and may be similar to the output device 54 of the user device 18. The output device 92 may be located with the processor 88, or located remotely and/or partially or completely network-based.

The memory 86 may store processor-executable code and/or information comprising the database 82 and cloud server software 84. In some embodiments, the cloud server software 84 may be stored as a data structure, such as the database 82 and/or data table, for example, or in non-data structure format such as in a non-compiled text file.

In one embodiment, the cloud server software 84 is a nocode/lowcode analytics tool to analyze data. The data may be retrieved from one or more timeseries database. In some embodiments, the cloud server software 84 may receive a datastream and store the datastream into a timeseries database. In some embodiments, both live data and archival data is stored in the timeseries database. Exemplary nocode/lowcode analytics tools may include Grafana (Raintank Inc., dba Grafana Labs, New York, NY) and/or Prometheus database. Grafana may be used to analyze data based on performance metrics, labels, and components associated with nodes 22.

Network elements 22 may include one or more devices that gather, process, store, and/or provide information in response to a request in a manner described herein. For example, Network elements 22 may include one or more optical data processing and/or traffic transfer devices, such as an optical node, an optical amplifier (e.g., a doped fiber amplifier, an erbium doped fiber amplifier, a Raman amplifier, etc.), an optical add-drop multiplexer ("OADM"), a reconfigurable optical add-drop multiplexer ("ROADM"), a flexibly reconfigurable optical add-drop multiplexer module ("FRM"), an optical source component (e.g., a laser source, or optical laser), an optical source destination (e.g., a laser sink), an optical multiplexer, an optical demultiplexer, an optical transmitter, an optical receiver, an optical transceiver, a photonic integrated circuit, an integrated optical circuit, a computer, a server, a router, a bridge, a gateway, a modem, a firewall, a switch, a network interface card, a hub, and/or any type of device capable of processing and/or transferring optical traffic.

In some implementations, Network elements 22 may include OADMs and/or ROADMs capable of being configured to add, drop, multiplex, and demultiplex optical signals. Network elements 22 may process and transmit optical signals to other network elements 22 throughout optical network 26 in order to deliver optical transmissions.

Layer 1 specific embodiments of the network element 22 may optionally be provided with additional elements that are not shown in the Figures such as an optical transceiver, a digital signal processor (DSP), and additional high-speed integrated circuit (ASIC or FPGA) that is specialized to handle high-speed data frames/packets.

Layer 0 specific embodiments of network element 22 may optionally be provided with additional elements that are not shown in the Figures such as a Wavelength Selective Switch (WSS), Variable Optical Attenuator (VOA), Erbium Doped Fiber Amplifier (EDFA), or Raman amplifiers, and optical channel monitors, for instance.

Figure 4:
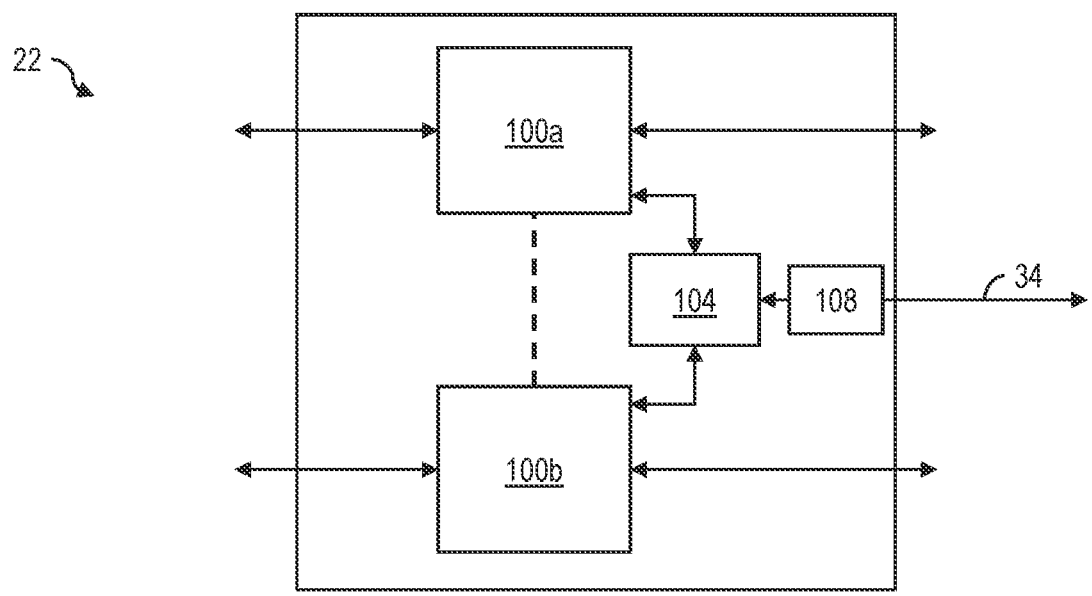
FIG. 4 is a diagrammatic view of an exemplary embodiment of a network element for use in the system of FIG. 1 constructed in accordance with the present disclosure.

Referring now to FIG. 4, shown therein is a diagram of an exemplary embodiment of a node 22, such as the first node 22*a* and/or the second node 22*b* of FIG. 1, constructed in accordance with the present disclosure. The node 22 generally comprises an embedded device 100 (shown as embedded device 100*a* and embedded device 100*b*), a communication device 104 to allow one or more component of the node 22 to communicate to one or more other component of the node 22 or to another node 22 in the system 10 via the network 34, and a controller card 108.

In one embodiment, the embedded device 100 includes one or more digital coherent optics module having one or more coherent optical transceiver operable to receive a client data from an electrical signal and transmit the client data in an optical signal and/or receive the client data from an optical signal and transmit the client data in an electrical signal, or a combination thereof. In one embodiment, the embedded device 100 may include one or more of the Layer 1 elements and/or Layer 0 elements as detailed above. The embedded optical device may have one or more property affecting a function of the embedded device and one or more status indicative of a current state of at least one component of the embedded device.

In accordance with the present disclosure, the network element 22 may be a holder, like a chassis, or a contained/logical equipment, like an optical line card within the chassis. In one embodiment, the network element 22 may be a logical entity comprising one or more chassis having one or more pluggable cards (such as one or more embedded device 100 and/or one or more controller card 108) that form the network element 22. For instance, pluggable cards may include traffic carrying ("data plane") cards (e.g., embedded device 100) that may have customized silicon such as ASICs or FPGAs that process the data plane frames/packets, based on the functionality of the card. Another exemplary traffic carrying card is a router line-card which has packet processing ASICs or other specialized silicon. Another exemplary embedded device 100 is an optical line card that includes a DSP module and/or optical photonic circuits. Pluggable cards may also refer to control cards ("control and management plane") that don't process data packets but run all the software that implement the control plane (routing protocols) and management plane (management interfaces such as CLI, NETCONF, gRPC, DHCP etc.) such as the controller card 108. The control card 108 typically has an off-the-shelf CPU (such as Intel or ARM) and run some variant of an operating system (more recently, Linux or QNX or BSD), described below in more detail. Other embedded devices 100 include common cards that may also be added such as fan trays, power entry modules, and others that provide auxiliary functions of the chassis.

It should be noted that the diagram of the node 22 in FIG. 4 is simplified to include one controller card 108 in communication with multiple embedded devices 100. It is understood that the node 22 may include more than one controller card 108, and each controller card 108 may be in communication with one or more embedded device 100 via the same or a different communication device 104.

The number of devices illustrated in FIG. 4 is provided for explanatory purposes. In practice, there may be additional devices, fewer devices, different devices, or differently arranged devices than are shown in FIG. 4. Furthermore, two or more of the devices illustrated in FIG. 4 may be implemented within a single device, or a single device illustrated in FIG. 4 may be implemented as multiple, distributed devices. Additionally, one or more of the devices illustrated in FIG. 4 may perform one or more functions described as being performed by another one or more of the devices illustrated in FIG. 4. Devices illustrated in FIG. 4 may interconnect via wired connections (e.g., fiber-optic connections).

Figure 5:
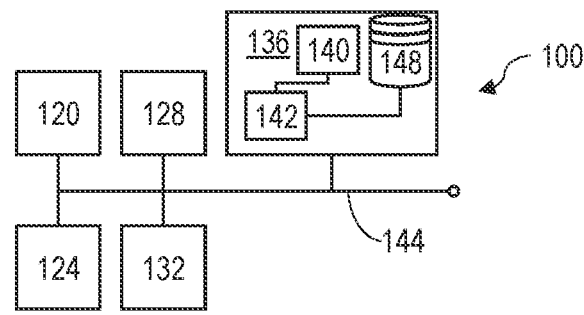
FIG. 5 is a diagrammatic view of an exemplary embodiment of an embedded device of FIG. 4 constructed in accordance with the present disclosure.

Referring now to FIG. 5, shown therein is an exemplary embodiment of the embedded device 100 constructed in accordance with the present disclosure. In some embodiments, the embedded device 100 may include, but is not limited to, one or more input device 120 (hereinafter "input device 120"), one or more output device 124 (hereinafter "output device 124"), one or more processor 128 (hereinafter "processor 128"), one or more communication device 132 (hereinafter "communication device 132") operable to interface with the communication device 104, one or more non-transitory computer-readable medium 136 (hereinafter "memory 136") storing processor-executable code and/or software application(s) (such as a performance monitoring domain agent, PMDA 140, described below in more detail) and a database 148. The input device 120, output device 124, processor 128, communication device 132, and memory 136 may be connected via a path 144 such as a data bus that permits communication among the components of the embedded device 100.

The input device 120 may be capable of receiving client data and transmitting the client data to other components of the system 10. The input device 120 may include, but is not limited to, implementation as an optical network interface, an electrical network interface, combinations thereof, and/or the like, for example.

The output device 124 may be capable of outputting client data. For example, implementations of the output device 124 may include, but are not limited to, implementation as an optical network interface, an electrical network interface, combinations thereof, and/or the like, for example.

In some embodiments, the database 148 may be a time series database. The database 148 may be a relational database or a non-relational database. Examples of such databases comprise, DB2®, Microsoft® Access, Microsoft® SQL Server, Oracle®, mySQL, PostgreSQL, MongoDB, Apache Cassandra, InfluxDB, Prometheus, Redis, Elasticsearch, TimescaleDB, and/or the like. It should be understood that these examples have been provided for the purposes of illustration only and should not be construed as limiting the presently disclosed inventive concepts. The database 148 can be centralized or distributed across multiple systems.

Figure 6:
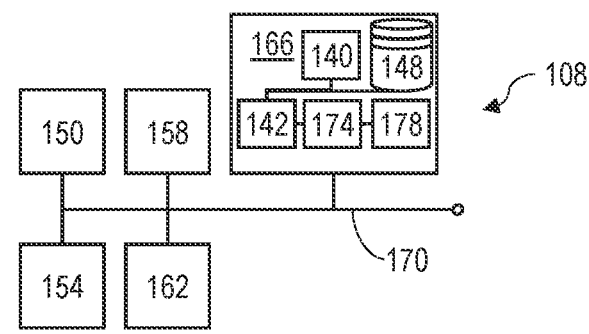
FIG. 6 is a diagrammatic view of an exemplary embodiment of a control card of FIG. 4 constructed in accordance with the present disclosure.

Referring now to FIG. 6, shown therein is an exemplary embodiment of the controller card 108 constructed in accordance with the present disclosure. In some embodiments, the controller card 108 may include, but is not limited to, one or more input device 150 (hereinafter "input device 150"), one or more output device 154 (hereinafter "output device 154"), one or more processor 158 (hereinafter "processor 158"), one or more communication device 162 (hereinafter "communication device 162") operable to interface with the communication device 104, one or more non-transitory processor-readable memory 166 (hereinafter "memory 166") storing processor-executable code and/or software application(s) (such as the PMDA 140, described below in more detail) and the database 148. The input device 150, output device 154, processor 158, communication device 162, and memory 166 may be connected via a path 170 such as a data bus that permits communication among the components of the controller card 108.

The input device 150 may be capable of receiving client data and transmitting the client data to other components of the system 10. The input device 150 may include, but is not limited to, implementation as an optical network interface, an electrical network interface, combinations thereof, and/or the like, for example.

The output device 154 may be capable of outputting client data. For example, implementations of the output device 154 may include, but are not limited to, implementation as an optical network interface, an electrical network interface, combinations thereof, and/or the like, for example.

The disclosure generally includes the PMDA 140 distributed between various components of the system 10. The PMDA 140 may be stored in the memory 136 and/or the memory 166 and be executed by either the processor 128 and/or the processor 158, respectively.

In one embodiment, the PMDA 140 may be considered a fungible software. For example, the PMDA 140 is compatible with standard container orchestration tools such as Docker Compose and Kubernetes and may be implemented with Docker and/or Kubernetes as a containerized service. In this manner, the design of the PMDA 140 allows for horizontal scaling in a distributed system. In some embodiments, the PMDA 140 uses secure containers, secure (TLS) connections, and/or the like.

In some embodiments, the database 148 is a datastore, such as a data lake (described above), a database, a block of memory, and/or the like.

Figure 7:
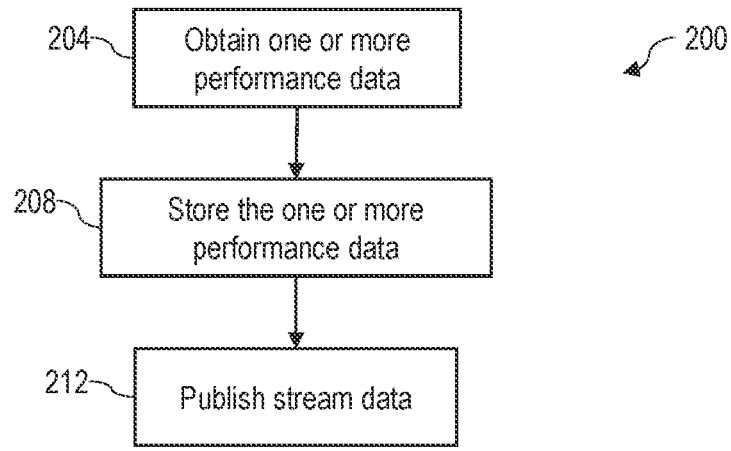
FIG. 7 is a process flow diagram of an exemplary embodiment of a telemetry process in accordance with the present disclosure.

Referring now to FIG. 7, shown therein is a process flow diagram of an exemplary embodiment of a telemetry process 200 in accordance with the present disclosure. The telemetry process 200 generally comprises the steps of: obtaining one or more performance information (step 204); storing the one or more performance information (step 208); and publishing stream data (step 212).

In one embodiment, obtaining one or more performance information (step 204) comprises collecting, by the PMDA 140, performance information from one or more other application, for example, another application being executed by either the processor 128 and/or the processor 158. For example, the PMDA 140 may request the one or more performance information from one or more other application and, in response to the request, the other application may respond with the one or more performance information.

In one embodiment, obtaining one or more performance information (step 204) comprises receiving the one or more performance information from one or more other application wherein the other application periodically raises one or more event comprising data indicative of the one or more performance information.

In one embodiment, obtaining one or more performance information (step 204) comprises subscribing, by the PMDA 140, to one or more message transmitted by one or more other application where the one or more message transmitted by the one or more other application includes one or more performance information. The one or more message may utilize, for example, a messaging protocol. The messaging protocol may include gRPC (Google, LLC, Mountain View, CA). Additionally, in some embodiments, the one or more message may be encoded based on the protobuf format, i.e., the protobuf encoding standard established by Google, LLC (Mountain View, CA). The protobuf is one example of an open, metadata-based format to encode data in archival logs or streams.

In one embodiment, obtaining one or more performance information (step 204) comprises retrieving the one or more performance information from the database 148. For example, in some embodiments, other applications may store one or more performance information in the database 148. The PMDA 140, executed by one or more processor, may be in communication with the database 148 and retrieve the one or more performance information from the database 148.

In one embodiment, obtaining one or more performance information (step 204) comprises receiving, by a performance monitoring collector daemon (PMCD 142), the one or more performance information from the PMDA 140. In other embodiments, the PMCD 142 orchestrates with the PMDA 140 and causes the PMDA 140 to transmit the one or more performance information to the PMCD 142. In one embodiment, obtaining one or more performance information (step 204) further comprises, the PMCD 142 in communication with one or more performance monitoring logger (PMLogger 174) and transmits to the PMLogger 174, the one or more performance information. The PMLogger 174 may be processor-executable code and/or a software application stored in the memory 166 and executed by the processor 158. In one embodiment, the PMLogger 174 may communicate, via a performance monitoring proxy (PMProxy 178) and the network 34 to the cloud-based server 30.

In one embodiment, the PMCD 142 may obtain the one or more performance information (step 204) from more than one PMDA 140.

In one embodiment, obtaining one or more performance information (step 204) may be performed periodically. For example, obtaining one or more performance information (step 204) may be performed every second, every minute, every 5 minutes, every hour, every 12 hours, every day, every week, or every month, or some combination thereof. In one embodiment, obtaining one or more performance information (step 204) may be performed as requested, e.g., as requested from a user or from one or more other application.

In one embodiment, obtaining one or more performance information (step 204) comprises obtaining the one or more performance information based at least in part on a selected performance metrics as described below in relation to a metrics configuration process 250 shown in FIG. 8.

In one embodiment, storing the one or more performance information (step 208) comprises storing the one or more performance information in the memory 136 if the PMCD 142 is executed by the processor 128 and/or storing the one or more performance information in the memory 166 if the PMCD 142 is executed by the processor 158.

In one embodiment, storing the one or more performance information (step 208) comprises storing the one or more performance information from each PMDA 140 received by each PMCD 142 into the memory 166 by the PMLogger 174.

In one embodiment, storing the one or more performance information (step 208) comprises storing the one or more performance information in the database 148. In some embodiments, the database 148 is a timeseries database and the one or more performance information is stored as time-series data in the database 148.

In one embodiment, storing the one or more performance information (step 208) comprises storing the one or more performance information as an archive file. The archive file may be stored in the memory 166 by the processor 158 executing the PMLogger 174.

In one embodiment, storing the one or more performance information (step 208) comprises storing, by the processor 158, the one or more performance information in the database 148 wherein the database 148 is a nosql database.

In one embodiment, storing the one or more performance information (step 208) further comprises using the protobuf schema to publish data in the database 148, for example, when the database 148 is a nosql database.

In one embodiment, storing the one or more performance information (step 208) comprises formatting, by the processor 158, the one or more performance information into a predetermined format that is known by both the controller card 108 and each embedded device 100. The predetermined format may be known by each of the PMDA 140, PMCD 142, and PMLogger 178. In one embodiment, the performance information may be stored in the database 148 or in an archive file as performance information formatted with the predetermined format.

In one embodiment, publishing stream data (step 212) comprises providing access to the stored one or more performance information from the network 34 via the communication device 162, for example. In some embodiments, publishing stream data (step 212) includes opening or enabling, by the processor 158 executing the PMProxy 178, one or more port on the communication device 162 to allow the communication device 162 to communicate with the cloud-based server 30 via the communication device 96 or user device 18 via the communication device 62, for example.

In one embodiment, publishing stream data (step 212) comprises utilizing one or more hardened performance co-pilot telemetry pipeline, performance co-pilot collector, and/or distribution pipeline. In this manner, the PMCD 142 and the PMProxy 178 are part of a performance co-pilot pipeline.

In one embodiment, publishing stream data (step 212) comprises sending a message to a subscriber using the messaging protocol, such as gRPC. The message may be formatted utilizing the protobuf format, for example.

Figure 8:
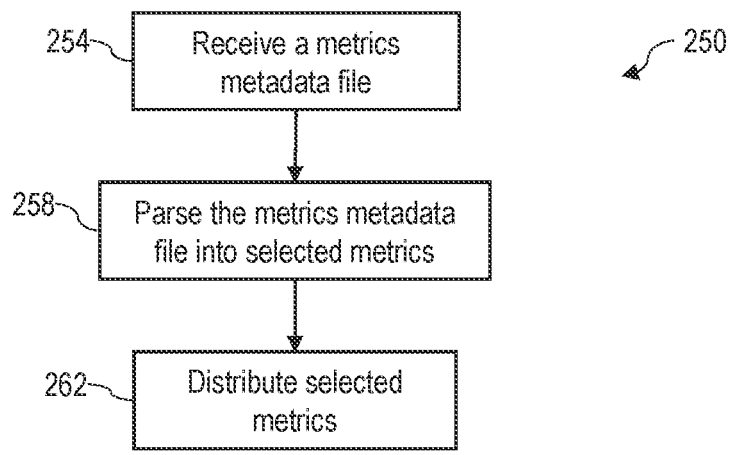
FIG. 8 is a process flow diagram for a metrics configuration process constructed in accordance with the present disclosure.

Referring now to FIG. 8, shown therein is a process flow diagram for a metrics configuration process 250 constructed in accordance with the present disclosure. The metrics configuration process 250 generally comprises: receiving a metrics metadata file (step 254); parsing the metrics metadata file into selected metrics (step 258); and storing the selected metrics (step 262).

In one embodiment, receiving a metrics metadata file (step 254) comprises receiving, via the network 34, the metrics metadata file. The metrics metadata file comprises one or more performance metric desired to be published. For example, a user may desire an additional performance metric regarding performance information of a component of the node 22 such as a temperature. The user may thus update the metrics metadata file to include a temperature metric, e.g., a particular performance metric.

In one embodiment, receiving a metrics metadata file (step 254) comprises receiving a metrics metadata file in a CSV format. The metrics metadata file may include a header identifying each column in the CSV file.

In one embodiment, receiving a metrics metadata file (step 254) comprises receiving the metrics metadata file in the CSV format having the header identifying each column in the CSV file. The header may comprise a name for each column in the CSV file and may include, for example, an index ID, a namespace ID, a device ID, an Attribute Name, a message header, a message class name, a value location, and an instance formula.

In one embodiment, parsing the metrics metadata file into selected metrics (step 258) comprises transmitting, by the processor 158, to the processor 128 of the embedded device 100, the performance metrics identified in the metrics metadata file as selected metrics. The processor 128 of the embedded device 100, executing the PMCD 142 may select one or more performance information based on the selected metrics, e.g., if the one or more performance information corresponds to at least one of the selected metrics. For example, if one of the selected metrics included a temperature of the processor 128, the PMCD 142 would collect a temperature value from the processor 128 as a performance information and transmit the performance information to the PMLogger 174.

In one embodiment, distributing the selected metrics (step 262) comprises transmitting to each PMDA 140 the selected metrics. In one embodiment, distributing the selected metrics (step 262) comprises updating the selected metrics on each embedded device 100 and the controller card 108.

In one embodiment, distributing the selected metrics (step 262) further comprises restarting the PMDA 140. When the PMDA 140 is a containerized service, restarting the PMDA 140 may include destroying, of bringing down, the container executing the PMDA 140 and bringing the container back up, e.g., with docker-compose. In this way, selected metrics may be modified without recompiling software stored in the memory 136 and executed by the processor 128 or stored in the memory 166 and executed by the processor 158.

In one embodiment, distributing the selected metrics (step 262) comprises storing the selected metrics in the memory 166. In other embodiments, distributing the selected metrics (step 262) comprises storing the metrics metadata file in the memory 166.

In one embodiment, distributing the selected metrics (step 262) comprises transmitting the selected metrics to only one embedded device 100, e.g., to the embedded device 100a, for example.

In one embodiment, when the controller card 108 boots up, the controller card 108 will generate the selected metrics from a metrics metadata file stored in the memory 166, or from the selected metrics stored in the memory 166, and transmit the selected metrics to each embedded device 100. In one embodiment, when the controller card 108 boots up, the controller card 108 will request the metrics metadata file, e.g., from the cloud-based server 30, for example.

Figure 9:
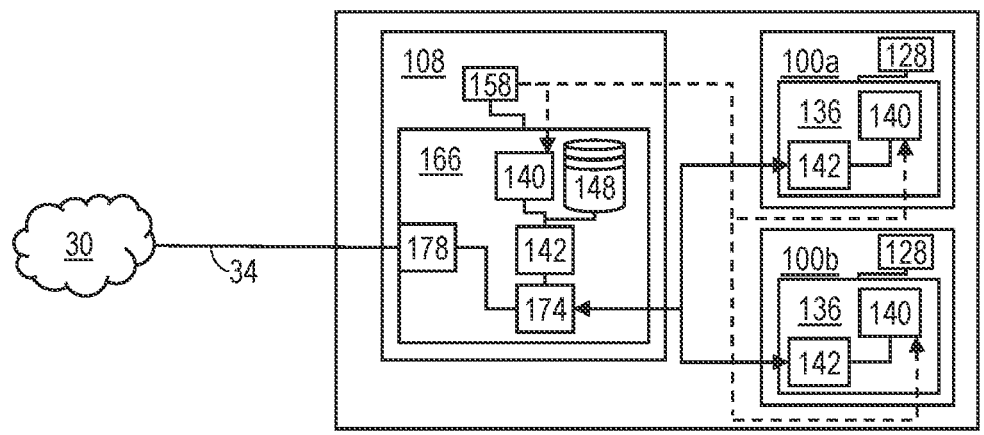
FIG. 9 is a functional diagram of an exemplary embodiment of the system constructed in accordance with the present disclosure.

Referring now to FIG. 9, shown therein is a functional diagram of an exemplary embodiment of the system 10 constructed in accordance with the present disclosure. As shown in FIG. 9, the PMLogger 174 receives performance information from each PMCD 142 of the embedded devices 100a and 100b as well as from the PMCD 142 stored in the memory 166 of the controller card 108. The PMLogger 174 further communicates the performance information to the cloud-based server 30 via the PMProxy 178. Further, when the processor 158 of the controller card 108 generates the selected metrics, the processor 158 may distribute the selected metrics to each PMDA 140 of the controller card 108 and each embedded device 100.

As described herein, by utilizing the metrics metadata file to generate performance information, the metrics metadata is defined using a standardized format.

From the above description, it is clear that the inventive concept(s) disclosed herein are well adapted to carry out the objects and to attain the advantages mentioned herein, as well as those inherent in the inventive concept(s) disclosed herein. While the embodiments of the inventive concept(s) disclosed herein have been described for purposes of this disclosure, it will be understood that numerous changes may be made and readily suggested to those skilled in the art which are accomplished within the scope and spirit of the inventive concept(s) disclosed herein.

What is claimed is:

1. A network element, comprising:
an embedded device having one or more property affecting a function of the embedded device;
a container;
a computing system having a processor and a memory, the memory being a non-transitory computer-readable medium storing a performance monitoring domain agent, a performance monitoring collector daemon, and a performance monitoring logger, the container being operable to execute the performance monitoring domain agent,
the performance monitoring collector daemon being processor-executable code that when executed by the processor causes the processor to communicate with the embedded device and collect one or more performance information of the embedded device based on the one or more property;
the performance monitoring domain agent being processor-executable code that when executed by the processor causes the processor to: retrieve the performance information from the performance monitoring collector daemon; format the performance information into a formatted data based on a metrics metadata file; and transmit the formatted data to the performance monitoring logger,
wherein the performance monitoring domain agent is processor-executable code that when executed by the processor further causes the processor to:
receive the metric metadata file;
decode the metric metadata file into selected metrics; and
store the selected metrics in the memory, and
wherein the performance monitoring domain agent is processor-executable code that when executed by the processor further causes the processor to restart the performance monitoring domain agent after storing the selected metrics in the memory, said restarting the performance monitoring domain agent includes bringing down the container executing the performance monitoring domain agent followed by bringing up the container.

2. The network element of claim 1, wherein the performance monitoring logger is processor-executable code that when executed by the processor causes the processor to store the formatted data into a database.

3. The network element of claim 2, wherein the database is a time-series database.

4. The network element of claim 2, wherein the database is stored in the memory.

5. The network element of claim 2 further comprising a communication device operable to communicate with a cloud-based server, and wherein the database is stored on the cloud-based server.

6. The network element of claim 1, wherein the computing system is a first computing system, the processor is a first processor, the memory is a first memory, the performance monitoring domain agent is a first performance monitoring domain agent, and the performance monitoring collector daemon is a first performance monitoring collector daemon, the network element further comprising:
a second computing system having a second processor and a second memory, the second memory being a non-transitory computer-readable medium storing a second performance monitoring domain agent and a second performance monitoring collector daemon; and wherein the performance monitoring domain agent is processor-executable code that when executed by the processor further causes the processor to:

upon receiving the metric metadata file, decode the metric metadata file into selected metrics; and transmit the selected metrics to the second computing system.

7. The network element of claim 1, wherein the performance monitoring domain agent is processor-executable code that when executed by the processor further causes the processor to restart the second performance monitoring domain agent after storing the selected metrics in the memory.

* * * * *